W. C. DUKE.
ADJUSTABLE PIPE HANGER.
APPLICATION FILED MAY 15, 1914. RENEWED SEPT. 15, 1916.

1,221,705.

Patented Apr. 3, 1917.

Inventor
W. C. Duke.

Witnesses

By Victor J. Evans
Attorney

UNITED STATES PATENT OFFICE.

WILBEY C. DUKE, OF SOUTH RICHMOND, VIRGINIA.

ADJUSTABLE PIPE-HANGER.

1,221,705.           Specification of Letters Patent.         Patented Apr. 3, 1917.

Application filed May 15, 1914, Serial No. 838,832.  Renewed September 15, 1916. Serial No. 120,418.

*To all whom it may concern:*

Be it known that I, WILBEY C. DUKE, a citizen of the United States, residing at South Richmond, in the State of Virginia, have invented new and useful Improvements in Adjustable Pipe-Hangers, of which the following is a specification.

This invention relates to improvements in pipe hangers and has for its general object the provision of a hanger so constructed that the pipe supporting rod is permitted to swing under expansion and contraction of the pipe, and which may be readily and easily adjusted to provide for the proper fall of the pipe in every so many feet.

Another object of the invention is the provision of a device of the above mentioned character, which is extremely simple in construction, comprising comparatively few parts which may be readily and quickly assembled or disassembled as the occasion may demand.

With these and other objects in view which will appear as the nature of the invention is better understood, the invention consists in the combination and specific construction and arrangement of parts which will be hereinafter more fully described and particularly pointed out in the appended claim.

In the drawing forming a portion of this specification in which like numerals of reference indicate similar parts in the several views.

Figure 1:
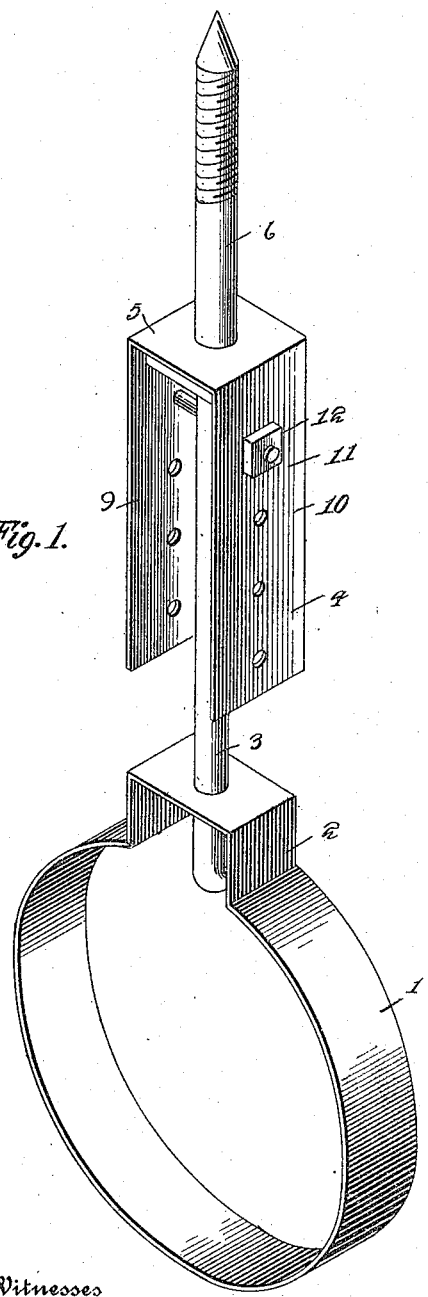
Figure 1 is a perspective view of the device constructed in accordance with my invention.
Figure 2:
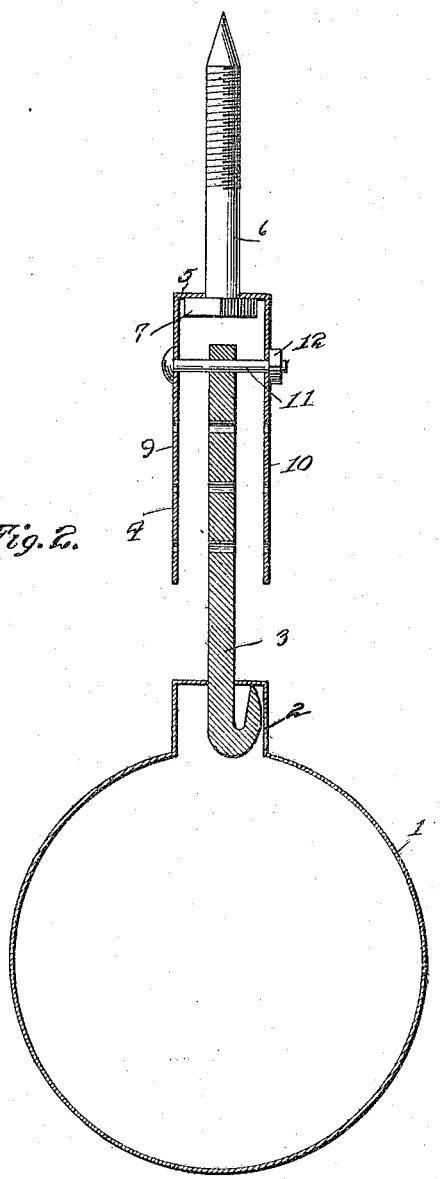
Fig. 2 is a vertical sectional view.

Referring to the drawing by numerals 1 designates the pipe ring which is slipped on the pipe before the fitting is put on, and which is formed with a vertically disposed offset portion as at 2. The offset portion is provided with a centrally disposed opening through which is extended a pipe supporting rod 3 which has one of its ends formed to provide a hook arranged in said offset portion for the purpose of supporting the ring and has its opposite end provided with a transverse opening the purpose of which will be hereinafter set forth. An adjustable plate is indicated at 4 and comprises a substantially inverted U-shaped member, the transverse portion 5 of which is provided with a centrally arranged opening through which is extended a lag screw 6 the head 7 of which engages the under side of the said transverse portion to support the said member. The said screw being adapted to be screwed into the ceiling or other suitable support for supporting the pipe in suspended position when the different parts of the hanger are assembled, as hereinafter described.

The legs 9 and 10 of the U-shaped member are provided with a plurality of alined openings with which the said transverse opening of the pipe supporting rod 3 is adapted to register when the said rod is arranged between the legs 9 and 10, and through which openings a threaded bolt 11 is passed and secured by means of the nut 12 to adjustably connect the said rod 3 and the plate 4 together. By reason of this construction and arrangement the pipe supporting rod 3 is pivotally mounted between the legs 9 and 10 of the said U-shaped member which are spaced from said rod to permit the latter to swing therebetween under expansion and contraction of the pipe, and that further the said rod may be adjusted so that the opening therein will register with any of the said openings of the legs 9 and 10 and supported therein by means of the bolt 11 whereby the proper adjustment may be obtained to provide for the proper fall of the pipe in every so many feet.

From the foregoing description taken in connection with the accompanying drawing the operation and advantages of the device will be readily understood by those skilled in the art, it being manifest that I have provided a hanger of the class in question which comprises comparatively few parts and which may be readily and quickly assembled or disassembled when desired.

While I have shown and described the preferred form of my invention it is to be understood that I am not to be limited to the precise construction and arrangement of parts herein shown, as various changes may be made within the scope of the appended claim.

What I claim is:—

A pipe hanger comprising a substantially inverted U-shaped member having alined openings in the opposite leg portions, and an opening in the top thereof, a pipe ring having a supporting rod rising therefrom and provided with an opening for registry with said alined openings, a bolt passing through said opening for adjustably and pivotally supporting said rod between said leg portions, and a fastening element extending upwardly through the opening in the top of said member as described.

In testimony whereof I affix my signature in presence of two witnesses.

WILBEY C. DUKE.

Witnesses:
C. H. ADAMS,
H. H. POLLOCK.